Figure 1:
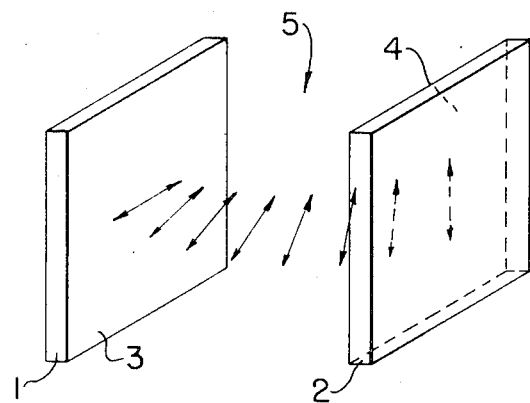

United States Patent [19]
Cartmell

[11] 3,749,474
[45] July 31, 1973

[54] ORIENTED LIGHT SCATTERING DISPLAY DEVICE

[75] Inventor: James V. Cartmell, Dayton, Ohio

[73] Assignee: The National Cash Register Company, Dayton, Ohio

[22] Filed: Nov. 26, 1971

[21] Appl. No.: 202,091

[52] U.S. Cl............................. 350/160 LC, 252/408
[51] Int. Cl................................................. G02f 1/16
[58] Field of Search........................... 350/150, 160; 252/408

[56] References Cited
UNITED STATES PATENTS
3,625,591  12/1971  Freiser............................... 350/150
3,655,270  4/1972  Creagh......................... 350/160 LC OTHER PUBLICATIONS
Schadt et al.: "Voltage–Dependent Optical Activity of a Twisted Nematic Liquid Crystal," Applied Physics Letters, Vol. 18, pp. 127.8, Feb., 1971.

Fergason et al.: "Liquid Crystals and Their Applications," Electro–Technology, pp. 41–50, Jan., 1970.

Primary Examiner—Edward S. Bauer
Attorney—E. Frank McKinney et al.

[57] ABSTRACT

An electro-optical, light scattering display device which employs nematic liquid crystal material is disclosed. The faces of the device bearing the conductive electrodes are unidirectionally oriented by rubbing. The liquid crystals align with their molecular axes parallel to the surface of the faces and along the rubbing direction with the field off. When the field is on, dynamic light scattering occurs in the electrode area. Due to this rubbing alignment, a rapid response between the on-off states is evident.

9 Claims, 2 Drawing Figures

ORIENTED LIGHT SCATTERING DISPLAY DEVICE

This invention relates to improved electro-optical display devices which employ nematic liquid crystal material.

An electro-optical display device having a layer of nematic liquid crystal material is known in the art, see U.S. Pat. No. 3,499,112. Upon the application of a voltage to the layer, an electric current flows through the layer causing an essentially non-destructive turbulence or light scattering. The degree of light scattering can be varied by varying the magnitude of the applied voltage between a threshold value necessary to initiate turbulence and a saturation value above which there is little or no change in the degree of light scattering. The degree of light scattering achieved generally is referred to as the dynamic scattering effect.

The above-described display devices generally comprise two glass plates with conductive planar electrodes on the interior surfaces, wherein at least one of the electrode planes is transparent. A thin layer of nematic liquid crystal material is sandwiched between the glass plates. The liquid crystal material exhibits essentially non-destructive turbulent motion upon the application of a voltage which produces an electric current in the layer. The device also includes means for applying a voltage to the layer.

A major problem with such dynamic scattering devices is a slow return to the off-state. These dynamic scattering devices rely on molecular relaxation for scattering elimination and, therefore, are very slow.

It now has been found that dynamic scattering devices are improved by an orientation of the nematic liquid crystal material such that the molecular axes at the surfaces of the two electrodes are normal to each other. This orientation is obtained by rubbing the electrodes with a material such as a cotton swab prior to construction of the cell. Due to this rubbing alignment, a rapid return to the off-state is evident when the electric field is removed.

Accordingly, an object of this invention is to provide an electro-optical display device.

Other objects, aspects and advantages of this invention will be apparent to one skilled in the art from the following specification, the drawing and appended claims.

In accordance with this invention, a thin sandwich cell is employed. The cell comprises two transparent plates coated on the interior surfaces with a transparent conductive material. The interior surfaces of the cell comprising the electrodes are rubbed uniformly along one direction. When the plates are brought together to form the cell, they are positioned so that the rubbing directions are at right angles to each other. The finished cell contains a thin layer of nematic liquid crystal material between the plates.

Stroking the electrodes interior surface causes the molecular axes of the liquid crystal material to align in that direction. This can be done by rubbing the clean surface with a dry cloth such as a cotton optical polishing cloth, see an article by Messrs. M. Schadt and W. Helfrich in Applied Physics Letters, Volume 18, Number 4, pages 127 and 128 (1971). In the absence of an electric field, the liquid crystals align with their molecular axes parallel to the surface of the plates and along the rubbing direction.

As the cell is assembled with rubbing directions at right angles to each other, the molecular axes are oriented so as to form a helix in the cell and polarized light transmitted through the cell is rotated 90°. Typically, light passing through a first polarizer is polarized in the horizontal position. As it passes through the cell it is rotated 90° so that it emerges polarized in a vertical position. If a second polarizer is aligned to transmit light only in a horizontal plane, the light is extinguished and the observer sees no light. When the field is on, dynamic light scattering occurs in the electrode area causing a disruption in the 90° helix and allowing light to be transmitted as in a rear projection screen. When the field is removed, a rapid return to the off-state is evident. This is due to rapid re-arrangement of the nematic liquid.

This rapid on-off state is advantageous in that a series of display devices oriented in accordance with this invention can be quickly scanned. Prior art devices often cannot be scanned in this manner due to slow restoration of the initial non-scattering state.

An additional feature of this invention is that a dark background can be provided by placing the cell between two linear polarizers whose transmission axes are parallel and oriented either parallel or perpendicular to the direction of rubbing. Polarizing unoriented devices in a simlar manner would not produce such a background due to the random orientation of the liquid crystal material. This device also functions as a reflected light display by removal of the polarizer, placement of a mirror behind the cell, and illuminating the device from the front.

The liquid crystal materials employed in this invention are nematic liquid crystals. In particular, these liquid crystals are characterized by a negative dielectric anisotropy, that is, in an electric field they tend to align with the molecular axis normal to the field direction. Compounds which exhibit this property are p-n-alkoxybenzilidene-p-aminobenzoalkyls. Often, to obtain liquid crystal materials which are liquid through a desired temperature range, it is necessary to form mixtures of liquid crystals. A typical example of this material is a mixture containing, by weight, 50 percent methoxybenzilidene-n-butylaniline and 50 percent ethoxybenzilidene-n-butylaniline. Another example is 100 percent methoxybenzilidene-n-butylaniline.

Indium oxide electrodes are most often used. Other electrodes include tin oxide, gold and the like. The electrode patterns are etched by conventional photo-etch techniques using hydrochloric acid for dissolution of the indium oxide. Other suitable etchants are employed for different electrode material. The electrode pattern can be any desired configuration such as a seven-bar matrix, a nine-bar matrix, X-Y line pattern and the like.

The transparent plates of the cell generally are glass.

Figure 2:
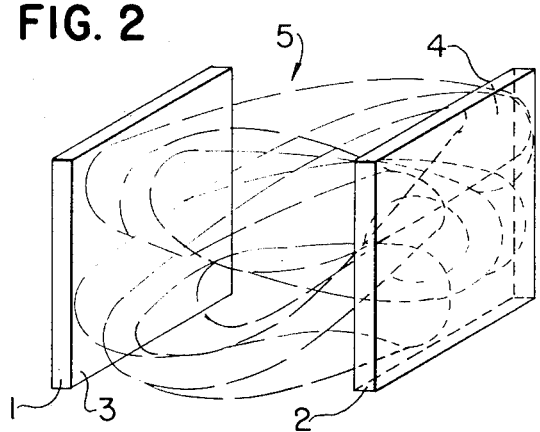

The display device of this invention is described in greater detail in connection with the accompanying drawing, in which FIG. 1 is a sectional view of the cell of this invention in the electric field-off mode and FIG. 2 is a sectional view of the cell of this invention in the electric field-on mode.

In FIG. 1, light rays (not shown) pass through substrates 1 and 2. These substrates are aligned so that their adjacent faces 3 and 4 are parallel and spaced about 0.5 to 1.0 mil apart. Shims (not shown) can be used to maintain this spacing. Prior to sealing, space 5 is filled with the desired liquid crystal materials. If desired, space 5 can be filled with liquid crystal material after sealing. Note, face 3 has been oriented so that the rubbing direction is horizontal and face 4 has been oriented so that the rubbing direction is vertical. The arrows indicate the 90° rotation of incident light through the substrates in the electric field-off mode.

In FIG. 2, the cell of FIG. 1 is shown in the electric field-on mode. Rather than light rotation as in FIG. 1, dynamic light scattering occurs in the electrode areas causing an image to be formed in the liquid crystal layer in space 5. When the electric field is removed, a rapid return to the off state is evident.

Two polarizers placed in uncrossed orientation in front and behind of the cell, extinguish light transmitted through the polarizers and cell in the field-off mode. A dark background over the entire display area is produced. In the field-on mode, light scattering occurs and a light character on a dark background is observed.

The device can be operated by application of a current potential across the cell. The preferred mode of operation is with A.C. potential or bipolar D.C. potential at 6. cycles per second. Unipolar D.C. potential also can be used. Typical threshold values are 10 volts for 60 cycle A.C. or D.C. The device of this invention is a current device which operates in the range of 6 microamps per square centimeter. The frequency generally employed with the device of this invention varies from 20 Hz to 200 Hz.

The cell of this invention is sealed prior to use. Generally, a thin ribbon of Ethylene Acrylic Acid copolymer is laid around the edge of the plates on the rubbed surface. The liquid crystal is placed between the plates and they are brought together with heat (to 100° C) and pressure. The copolymer wets the cell surfaces near the edges and effectively seals the cell.

The advantages of this invention are further illustrated by the following examples. The materials and specific conditions are presented as being typical and should not be construed to limit the invention unduly.

EXAMPLE 1

A test cell comprising a seven-bar figure eight design was constructed using 2 inches × 2 inches glass substrates. These glass plates were initially coated with transparent electrode (Indium Oxide) and etched on the HCL to the seven-bar design. The interior surfaces of each side of the cell were rubbed unidirectionally with optical cloth such as to cause alignment of the nematic liquid crystal on the interior cell surface along the rubbing direction. Upon assembly of the cell the substrates were positioned such that the rubbing direction of the aligned interior surfaces were 90° to one another. Thus when the liquid crystal layer was placed between the glass substrates a 90° helix of the molecular axes was imposed in the thin layer, i.e., about 0.15 mil. The liquid crystal mixture utilized in this test cell consisted of a 1 mole to 1 mole mixture of p-Methoxy Benzilidene-p-n-Butylaniline (MBBA), p-Ethoxy Benzilidene-p-n-Butylaniline (EBBA), with a liquid crystal range of 0° to 59° C. The test cell was sealed around the exterior edges with Ethylene Acrylic Acid polymer. Upon placing uncrossed polarizers in front of, and behind the test cell a dark state (cross polar effect) was observed due to the rotation of the polarized light by the liquid crystal 90° helix. Upon subjection of an electric field to the test cell and the resulting turbulence caused by dynamic scattering, those areas with the electrode seven-bar pattern exhibit and transmit light. Contract ratios of 50:1 are typical. This device also functions without polarizers with the viewer observing scattered light in the field imposed areas. Typical response time for this cell of 30 volts, 60 cycle AC drive were 10 milliseconds ON and 40 milliseconds OFF.

EXAMPLE II

A second cell was constructed identical to the above except elimination of the rubbing of the interior cell surfaces. In this case, placing polarizer behind, and in front of the cell does not result in a dark background in that random orientation of the liquid crystal layer on the interior cell surfaces causes some light to be transmitted thru the polarizers regardless of their orientation. The observed scattering of light for this test cell was markedly inferior to that of the rubbed cell. Typical response time for this cell were 40 milliseconds ON and 100 milliseconds OFF.

Although this invention has been described in considerable detail, it must be understood that such detail is for the purposes of illustration only and that many variations and modifications can be made by one skilled in the art without departing from the scope and spirit thereof.

What is claimed is:

1. In an electro-optic display device of the type which alters the scattering of light comprising two spaced transparent plates: one face of each of the plates being coated with an electrically conductive film, at least one film being transparent, and each film being rubbed to exhibit unidirectional orientation effects; the two plates being spaced with the faces bearing the conductive films adjacent; electrical conductive leads attached to the conductive films on the two plates; means for applying a voltage gradient between the leads; and at least one nematic liquid crystal material of the type that exhibits non-destructive turbulent motion and negative dielectric anisotropy upon the application of a voltage which produces an electric current in the liquid crystal material filling the space between the two plates wherein, as a result of the unidirectional orientation effect of the rubbed films, the molecular axes of the nematic liquid crystal material are unidirectionally oriented at the faces of the plates;

the improvement which comprises positioning the faces of the plates so that the molecular axes of the nematic liquid crystal material at the faces of the plates are at right angles to one another.

2. A device according to claim 1 wherein the two spaced transparent plates are sandwiched between two uncrossed linear polarizers.

3. A device according to claim 1 wherein the nematic liquid crystal is p-n-alkoxybenzilidene-p-aminobenzoalkyl.

4. A device according to claim 1 wherein the nematic liquid crystal material is a 1 mole to 1 mole mixture of methoxybenzilidene-n-butylaniline and ethoxybenzilidene-n-butylaniline.

5. A device according to claim 1 wherein the nematic liquid crystal material is methoxybenzilidene-n-butylaniline.

6. A device according to claim 1 wherein the electrically conductive film is indium oxide.

7. A device according to claim 1 wherein the voltage gradient is A.C. potential or bipolar D.C. potential at 20 to 200 cycles per second.

8. A device according to claim 1 wherein the voltage gradient is A.C. potential or bipolar D.C. potential at 60 cycles per second.

9. A device according to claim 1 wherein the two spaced transparent plates are glass.

* * * * *